US011144616B2

(12) United States Patent
Tan et al.

(10) Patent No.: US 11,144,616 B2
(45) Date of Patent: Oct. 12, 2021

(54) TRAINING DISTRIBUTED MACHINE LEARNING WITH SELECTIVE DATA TRANSFERS

(71) Applicant: Cisco Technology, Inc., San Jose, CA (US)

(72) Inventors: Wai-tian Tan, Sunnyvale, CA (US); Rob Liston, Menlo Park, CA (US); John G. Apostolopoulos, Palo Alto, CA (US); Xiaoqing Zhu, Austin, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 1101 days.

(21) Appl. No.: 15/439,072

(22) Filed: Feb. 22, 2017

(65) Prior Publication Data
US 2018/0240011 A1 Aug. 23, 2018

(51) Int. Cl.
*G06F 17/18* (2006.01)
*G06F 9/46* (2006.01)
(Continued)

(52) U.S. Cl.
CPC ............... *G06F 17/18* (2013.01); *G06F 9/46* (2013.01); *G06N 3/0454* (2013.01); *G06N 3/063* (2013.01); *G06N 3/084* (2013.01)

(58) Field of Classification Search
CPC ......... G06F 17/18; G06F 9/46; G06N 3/0454; G06N 3/063; G06N 3/084; G06N 5/003
See application file for complete search history.

(56) References Cited

U.S. PATENT DOCUMENTS 9,413,779 B2 8/2016 Vasseur et al.
9,477,654 B2 10/2016 He et al.
(Continued)

FOREIGN PATENT DOCUMENTS

| EP | 2672423 A1 * | 12/2013 | ......... G06K 9/00248 |
| WO | 2014205231 A1 | 12/2014 | |
| WO | 2015154216 A1 | 10/2015 | |

OTHER PUBLICATIONS

Candel, et al., "Deep Learning with H2O," http://h2o-release.s3.amazonaws.com/h2o/master/3300/docs-website/h2o-docs/booklets/DeepLearning_Vignette.pdf, Dec. 2005, 52 pages.
(Continued)

*Primary Examiner* — Kamran Afshar
*Assistant Examiner* — Urmana Islam
(74) *Attorney, Agent, or Firm* — Edell, Shapiro & Finnan, LLC

(57) ABSTRACT

Presented herein are techniques for training a central/global machine learning model in a distributed machine learning system. In the data sampling techniques, a subset of the data obtained at the local sites is intelligently selected for transfer to the central site for use in training the central machine learning model. In the model merging techniques, distributed local training occurs in each local site and copies of the local machine learning models are sent to the central site for aggregation of learning by merging of the models. As a result, in accordance with the examples presented herein, a central machine learning model can be trained based on various representations/transformations of data seen at the local machine learning models, including sampled selections of data-label pairs, intermediate representation of training errors, or synthetic data-label pairs generated by models trained at various local sites.

24 Claims, 14 Drawing Sheets

(51) Int. Cl.
  *G06N 3/04* (2006.01)
  *G06N 3/08* (2006.01)
  *G06N 3/063* (2006.01)
  *G06N 5/00* (2006.01)

(56) References Cited

U.S. PATENT DOCUMENTS

| | | | |
|---|---|---|---|
| 2003/0065535 A1* | 4/2003 | Karlov | G16H 50/70 705/2 |
| 2007/0150424 A1* | 6/2007 | Igelnik | G06K 9/6222 706/15 |
| 2008/0208526 A1* | 8/2008 | Thibaux | G06K 9/00536 702/176 |
| 2011/0320767 A1* | 12/2011 | Eren | G06N 20/00 712/30 |
| 2015/0139485 A1 | 5/2015 | Bourdev | |
| 2015/0213157 A1* | 7/2015 | Hepworth | G06F 30/00 703/1 |
| 2018/0032908 A1* | 2/2018 | Nagaraju | G06F 11/30 |
| 2018/0095140 A1* | 4/2018 | Park | G01R 31/367 |
| 2018/0375720 A1* | 12/2018 | Yang | H04L 69/40 |
| 2019/0050747 A1* | 2/2019 | Nakamura | G06N 5/048 |
| 2019/0354860 A1* | 11/2019 | Karg | G06N 3/08 |

OTHER PUBLICATIONS

Dean, et al., "Large Scale Distributed Deep Networks," Advances in Neural Information Processing Systems 25 (NIPS2012), Dec. 2012, 9 pages.

Zhao, et al., "Communication-Efficient Distributed Stochastic Gradient Descent with Butterfly Mixing," Technical Report No. UCB/EECS-2012-96, http://www.eecs.berkeley.edu/Pubs/TechRpts/2012/EECS-2012-96.html, May 11, 2012, 15 pages.

Yosinski, et al., "Understanding Neural Networks Through Deep Visualization," ICML DL Workshop Paper, http://yosinski.com/media/papers/Yosinski_2015_ICML_DL_Understanding_Neural_Networks_Through_Deep_Visualization_.pdf, 12 pages.

Mahendran, et al., "Understanding Deep Image Representations by Inverting Them," The IEEE Conference on Computer Vision and Pattern Recognition (CVPR), Jun. 2015, 9 pages.

* cited by examiner

TRAINING DISTRIBUTED MACHINE LEARNING WITH SELECTIVE DATA TRANSFERS

TECHNICAL FIELD

The present disclosure relates to distributed machine learning.

BACKGROUND

Machine learning processes, such as neural networks (e.g., deep neural networks), provide computing devices with the ability to learn without being explicitly programmed. In particular, machine learning processes can grow and change/adapt when exposed to new data. Machine learning processes can be trained to perform a number of different tasks. However, in general, the effectiveness of a machine learning process in performing its assigned task is strongly correlated to the training of the process, particularly the quantity of the training data that is provided to the process.

DESCRIPTION OF EXAMPLE EMBODIMENTS

Overview

Figure 1:
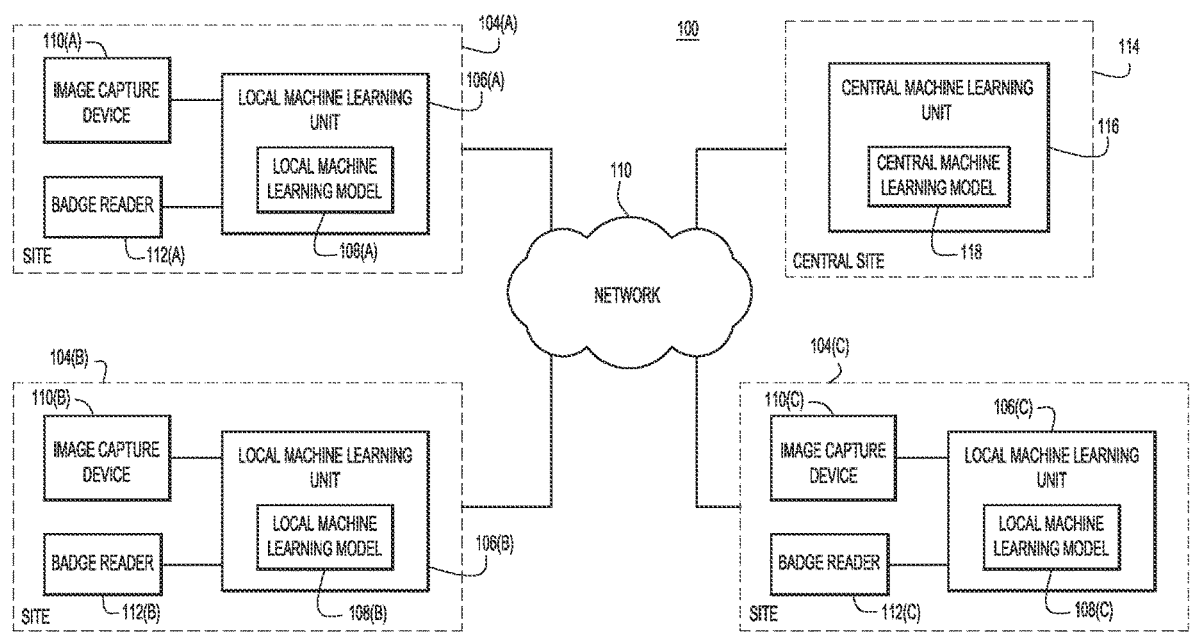
FIG. 1 is a block diagram of an arrangement in which the techniques presented herein may be implemented.

Presented herein are techniques for training a central/global machine learning model in a distributed machine learning system. In the data sampling techniques, local sites intelligently select a subset of captured data for transfer to the central site. The central site uses the subset of captured data to training the central machine learning model. In the model merging techniques, each local site performs distributed local training and sends a copy of the respective local machine learning model to the central site for aggregation of learning by merging of the models. As a result, in accordance with the examples presented herein, a central machine learning model may be trained based on various representations/transformations of data seen at the local machine learning models, including sampled selections of data-label pairs, intermediate representation of training errors, or synthetic data-label pairs generated by models trained at various local sites.

DETAILED DESCRIPTION

The use of machine learning processes/applications/models has expanded greatly and these processes are now used in a number of different manners to perform many different tasks. A particular use of machine learning processes is for facial or person recognition in a distributed enterprise environment that includes multiple sites/locations. In such an arrangement the different enterprise locations may each execute a localized (local) version of the same machine learning process/model to perform the same assigned task (i.e., person recognition). Such an arrangement is referred to herein as a "distributed machine learning arrangement." In such examples, the distributed machine learning system comprises a central/global machine learning process executed at the central site and the multiple local machine learning processes each executed at one of the distributed sites.

In a distributed machine learning system, the success of the learning relies on the abundance of data that is used to train the machine learning processes. However, for various applications, such as those that involve video, it may be impractical to send all the data to a central site (e.g., cloud) for processing, either for training of the machine learning processes or for execution of the machine learning processes on live data. This is especially true for companies with many separate branches or campuses where the potentially large number of videos would need to go over constrained and potentially expensive Wide Area Network (WAN) connections. Therefore, presented herein are techniques to train/update a global/central machine learning process using information from a plurality of local sites, without requiring all of the data (e.g., video data) to be sent to a central site (e.g., leverage the abundance of video data at all the local branches/campuses for improving learning, without requiring the sending of the huge amount of video data to the central site). The updated central machine learning process can then be redistributed to the multiple branches/campuses for local application of the process.

For example, FIG. 1 is block diagram of an enterprise environment 100 that includes a distributed machine learning system 102 in which the techniques presented herein may be implemented. In this example, the enterprise environment 100 is comprised of a central site 114 and three (3) distributed sites, referred to as sites 104(A), 104(B), and 104(C). The sites 104(A), 104(B), and 104(C) may be physically separate locations, such as campuses, branches, etc.

The central site 114 includes a central/global machine learning unit 116 that includes a central/global machine learning process/model 118. To avoid unnecessarily sending massive amounts of data to the central site 114 for centralized processing, each of the distributed sites 104(A), 104(B), and 104(C) runs a separate copy of the central machine learning model 118. These separate copies are referred to herein as local machine learning processes/models 108(A), 108(B), and 108(C), respectively, and are part of a respective local machine learning unit 106(A), 106(B), and 106(C). As such, the distributed machine learning system 102 comprises the central machine learning model 118 and the local machine learning models 108(A), 108(B), and 108(C).

The local machine learning models 108(A), 108(B), and 108(C) are deployed and configured to perform the same task and, at least at the time of initial deployment, are copies of the central machine learning model 118. As noted above, machine learning models can be trained to perform a number of different tasks. However, for ease of illustration, the techniques presented herein are described with reference to the local machine learning models 108(A), 108(B), and 108(C) performing a specific task, namely person recognition as a person enters a secured building at the corresponding site 104(A), 104(B), and 104(C). As such, in this specific example, each site also includes a respective image capture device 110(A), 110(B), and 110(C) that is configured to capture one or more still or moving images (e.g., videos) of persons entering through an entrance of a secured building at the corresponding site 104(A), 104(B), and 104(C).

FIG. 1 also illustrates that the sites 104(A), 104(B), and 104(C) each include a respective badge reader 112(A), 112(B), and 112(C) that is located at the entrance of the secured building. In this example, to enter the respective secured buildings, a person has a personal identity (ID) badge and uses this badge to perform a badge swipe using the corresponding badge reader 112(A), 112(B), or 112(C). The person entering the site is identified by the badge swipe. In addition, the local machine learning models 108(A), 108(B), or 108(C) analyze the captured images of the person as he/she enters the corresponding site. The corresponding local machine learning model 108(A), 108(B), or 108(C) then makes a "prediction" of the identity of the person. The person may be admitted to the building based on results of the badge swipe and/or the identity prediction made by the respective local machine learning model.

The use of the local machine learning models 108(A), 108(B), and 108(C) in combination with a respective badge reader 112(A), 112(B), and 112(C) is a form of two-factor authentication at each local site. In certain examples, the identity information obtained from a badge swipe can be used to adapt the corresponding local machine learning model.

As noted above, presented herein are techniques to train a central machine learning process using information/data obtained from a plurality of local sites, without requiring all of the data (e.g., video data) to be transmitted to the central site. Certain examples presented herein use data sampling techniques in which data is intelligently selected and sent to the central site for training of the central machine learning process. Other examples presented herein use model merging techniques in which each local site performs distributed local training and the trained local learning models are sent to the central site for aggregation of learning by merging of the models. The data sampling techniques are described further below with reference to FIGS. 2A, 2B, 3, 4, and 5, while the model merging techniques are described further below with reference to FIGS. 6-13. In both techniques, the updated central machine learning model is redistributed to the multiple branches/campuses for local application of the updated model.

Data Sampling

For ease of illustration, the data sampling techniques for training a central machine learning process are described with reference to the general arrangement of FIG. 1 where multiple local machine learning processes perform person recognition. However, it is to be appreciated that this specific use and arrangement is merely illustrative and that the techniques presented herein may be used in other arrangements and to perform other tasks.

Figure 2A:
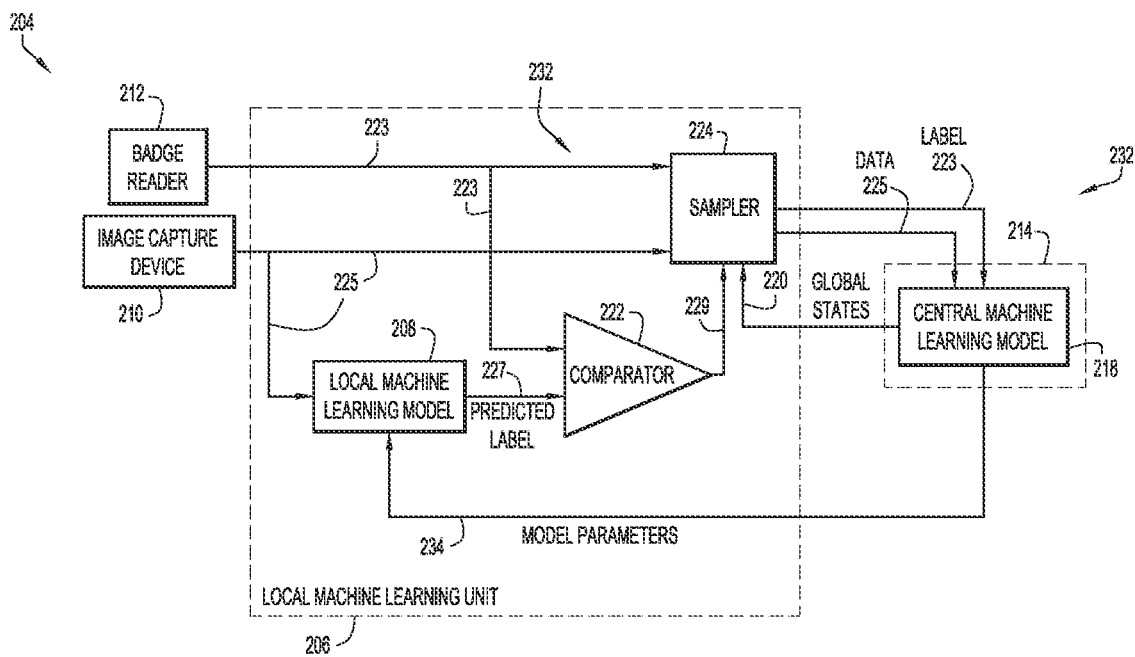
FIG. 2A is a schematic block diagram illustrating an arrangement of a local site configured to implement data sampling techniques, in accordance with embodiments presented herein.

FIG. 2A is a block diagram illustrating one example arrangement for a local site 104(A), 104(B) or 104(C), referred to herein as local site 204, that is configured to implement the data sampling techniques presented herein. As noted above, distributed arrangements include multiple sites and, as such, FIG. 2A illustrates only one of a plurality of local arrangements that would be present in a distributed system. That is, the same or similar arrangement as shown in FIG. 2A would be implemented at multiple local sites.

As shown, the local site 204 includes a local machine learning unit 206, an image capture device 210, and a badge reader 212. The local machine learning unit 206 comprises a local machine learning process/model 208, a comparator 222, and a sampler 224. For completeness, also shown in FIG. 2A is a central site 214 that includes a central machine learning module 218.

As a person enters the secured building at local site 204, he/she uses the badge reader 212 to perform a badge swipe. The badge reader 212 generates a badge output, represented by arrow 223, that indicates the determined identity of the person (i.e., the identity determined based on the badge swipe). In addition, the image capture device 210 is configured to capture images of the person as he/she enters the secured building. Through the use of motion tracking, face detection, or other techniques, it is generally possible to determine that portions of different images correspond to the same person.

In the example of FIG. 2A, the images captured by the image capture device 210, which are generally represented by arrow 225, are provided to the local machine learning model 208. Using the images 225 (i.e., the "data"), the local machine learning model 208 is executed to generate/obtain a prediction of the identity of the person in the captured images. The identity prediction generated by the local machine learning model 208 is referred to herein as a "predicted label" and is generally represented in FIG. 2A by arrow 227.

The comparator 222 receives the predicted label 227 from the local machine learning model 208 as well as the badge output 223 from the badge reader. The comparator 222 is configured to compare the predicted label 227 generated by the local machine learning model 208 to the badge output 223 to confirm whether the local machine learning model 208 correctly predicted the identity of the person as he/she enters the secured building. Stated differently, since the badge output 223 and the predicted label 227 both represent the same information (i.e., the identity of the person), the badge output 223 is sometimes referred to herein as a "label" which can be used to validate the predicted label 227.

As noted, FIG. 2A illustrates a specific example in which the badge reader 212 provides the label 223. It is to be appreciated that labels may be generated in other manners and that the label does not need to be authoritative, or from a different data source. For example, in a motion-tracked system, the label can be a delayed version of an earlier predicated label. In other examples, the label could be a different out-of-band mechanism, such as audio result, voice recognition, etc. to furnish a factor that is orthogonal to visual information.

As noted the local machine learning model 208 operates to determine whether portions of different images correspond to the same person and to identify the person as represented in the different images. It is possible that, for certain images, the local machine learning model 208 does not properly identify the person even though the images may correspond to the same person who is properly identified in other images. Since it is possible to determine whether any of these failed identifications contain a valid employee (validated based on their badge swipe using the comparison of the comparator 222), these failed identifications represent "surprises" that are unexpected and/or undesirable. As such, "surprises" represent instances in which the predicted label 227 does not match the label 223 (i.e., the prediction by the local machine learning model 208 is incorrect).

The comparator 222 provides the sampler 224 with an indication 229 that represents the result of the validation of the predicted label 227. The sampler 224 also receives the data 225 (i.e., a captured image) from the image capture device 210 and the label 223 (i.e., the badge output). As used herein, a captured image and an associated badge output or label 223 collectively represent a data-label pair 232. As described further below, based on one or more factors the sampler 224 is configured to determine whether or not the corresponding data-label pair 232 should be sent to the central site 214. Data-label pairs 232 sent to the central site 214 are used to train the central machine learning module 218.

In certain examples, the sampler 224 is configured to perform a sampling probability calculation to determine whether a data-label pair 232 should be sent to the central site 214 for use in training the central machine learning module 218. That is, the sampler 224 may consider a probability, along with the label and the data, to determine when to send the data-label pair to the central site 214.

The sampler 224 may implement any one of number strategies to select data-label pairs that are to be sent to the central site 214. In one example, the sampler 224 is configured to forward all data-label pairs where the predicted label 227 does not match (i.e., is different from) the actual label 223. In such examples, the sampler 224 is also configured to randomly forward a fraction (e.g., 10%) of data-label pairs where the predicted label 227 matches with the actual label 223.

In another example, the sampler 224 is again configured to forward all data-label pairs where the predicted label 227 does not match (i.e., is different from) the actual label 223. However, in these examples, for data-label pairs where the actual label 223 matches the predicted label 227, the sampler 224 may forward data-label pairs based on a probability distribution. For example, the sampler 224 may compute an entropy value from the predicted label 227 probability distribution $[p_1, p_2, \ldots p_n]$ corresponding to softmax layer values for n labels, given as:

$$H = -\sum_{i=1}^{n} p_i \log(p_i)$$

The sampler 224 forwards correctly predicted data-label pairs where the output entropy value H exceeds a predetermined threshold. Other than entropy, the forwarding decision can also be made based on alternative functions of the probability distribution, such as diversity index $$\left(H = 1 - \sum_{i} p_i^2\right)$$

and max-likelihood $$(H = 1 - \max_{i} p_i).$$

In accordance with certain examples presented herein, when a data-label pair is sent to the central site 214, the data-label pair may be accompanied by meta-data that indicates whether or not the predicted label matches the actual label (i.e., whether the label was correctly or incorrectly predicted by the local model). Alternatively, the central site 214 may determine whether or not the label was correctly or incorrectly predicted by the local model. However, because of updates at the central site 214 or other reasons, it may be desirable to explicitly indicate if the local model correctly or incorrectly predicted that label.

It is to be appreciated that the above described sampling strategies are illustrative and that other strategies may be used in the data sampling techniques presented herein. For example, in certain examples, the sampler 224 uses a probability to determine whether to forward data-label pairs. In certain examples, the probability provides an indication of whether or not a predicted label 227 matches the actual label 223. In such example, a correct prediction by the local machine learning model 208 results in a lower probability, while an incorrect prediction results in a higher probability. The probability for correct predictions may be set at level where the associated data-label pairs will be periodically selected and sent to the central machine learning model 218. It is desirable to periodically send data-label pairs associated with correct predictions to account, for example, changes that occur over time (e.g., a person getting older).

In further examples, the probability can be set based on the difference between the predicted label 227 and the actual label 223 (i.e., the probability can reflect or correlate to the error in the prediction) and/or can be set based on reasons for the incorrect prediction. More specifically, there are a number of different reasons that a predicted label 227 could fail validation, including poor image quality (e.g., motion blur), poor angle, the person is different clothing or wearing glasses, imperfections in the machine learning model 208, etc. Predictions generated based on images with high quality and good angle that fail validation reflect errors in the model and, as such, should be sampled with high probability for sending back to the central site 214 for use in training and improving the model. In contrast, images that are blurred or with poor angles that failed validation can be sampled with low probability to save bandwidth since that are not helpful examples to help differentiate different persons.

As shown in FIG. 2A, the sampler 224 may be configured to receive global state information 220. The global state information 220 is information received from the central site 214 that can be used to control/adjust a threshold of data sample selection (e.g., image quality for indoor vs. outdoor sites), or how many data samples are selected (e.g., security level at different sites). That is, the global state information 220 may be used to globally coordinate how the sampling can be set across different sites. For instance, since in one embodiment all sites are running the same model (trained at the central site), the samplers 224 at the different sites can follow the same criteria (e.g., a threshold value on the cross-entropy loss function calculated by the model, subject to sufficiently high input image quality) in determining which sample images to send to the central site. It is to be appreciated that such globally shared criteria can also be adjusted over time, based on training performance of the central machine learning model 218.

In other examples, if different sites operate under different conditions (e.g., different lighting), the selection criteria of data-labels for sending to the central 214 may be different. For example, a lower standard may be applied for "sufficient image quality" for, e.g., outdoor sites versus indoor sites with controlled lighting. Furthermore, relative weights may be generated and applied by the sampler 224 so as to obtain more samples from certain sites than from other sites. These relative weights controlling which sites to draw more sample images from can also be centrally determined and adjusted. For example, it may be desirable to draw more images from sites having greater business value, sites having greater security concerns, etc.

In further examples, the selection criteria can also differ based on different "classes." For example, the system may already have many images corresponding to a long time employee, but relatively few images of new hires. Long time employees and new hires may be placed in different classes and the sampler 224 may preferentially select more data-label pairs associated with preferred "classes."

Figure 3:
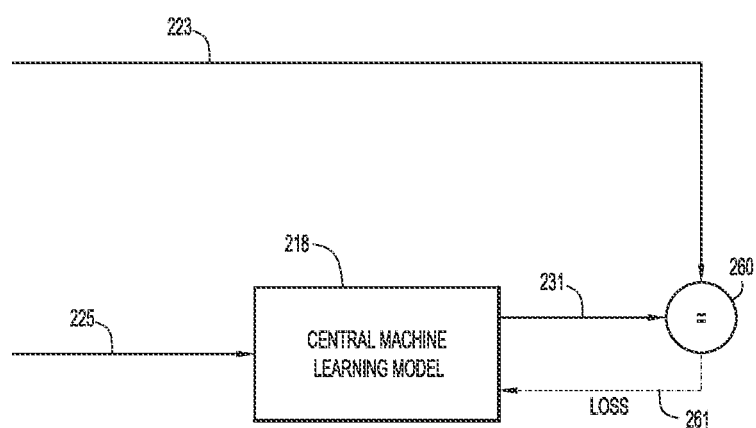
FIG. 3 is a diagram illustrating the training of a central machine learning model based on sampled data, in accordance with embodiments presented herein.

As noted above, data-label pairs 232 sent to the central site 214 are used to train the central machine learning module 218. This training process is generally depicted in FIG. 3. Shown in FIG. 3, a loss function 260 calculates is a "loss," which represents the error/difference between a predicted label 231 generated by the central machine learning module 218 (using the data 225 of a data-label pair) and the associated label 223 (the label in the data-label pair). The determined loss 261 is fed back to the central machine learning model 218 and used to adapt the model until the predicted label 231 matches the label 223 (i.e., the network trains itself by minimizing the loss/error).

Returning to FIG. 2A, as noted, the central machine learning model 218 is trained using data-label pairs received from multiple sites. As such, the central machine learning model 218 is updated to incorporate the data learned at each of the local sites. Periodically, the updated central machine learning model 218 is deployed back to the different sites (e.g., site 204) where the updated central machine learning model 218 replaces the current local machine learning models. That is, as shown by arrow 234, the central machine learning model parameters are sent to each of the local sites for use as the local machine learning models.

Figure 2B:
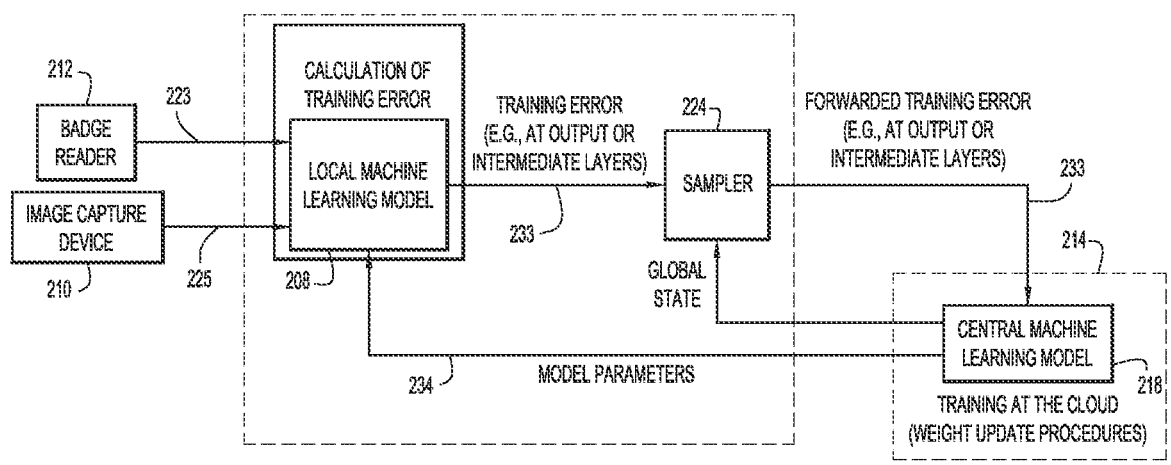
FIG. 2B is a schematic block diagram illustrating another arrangement of a local site configured to implement data sampling techniques, in accordance with embodiments presented herein.

FIG. 2B is a block diagram illustrating an alternative arrangement for a local site 104(A), 104(B) or 104(C), referred to herein as local site 304, that is configured to implement the data sampling techniques presented herein. In this example, the local machine learning model 208 is configured to maintain a copy of the model parameters (i.e., weights) from the central machine learning model 214. The local machine learning model 208 uses the stored parameters to calculate training errors for a given data-label pair at the local site, but does not update the stored model parameters. In FIG. 2B, the training error determined by the local machine learning model 208 is represented by arrow 233.

The training error 233 is forwarded to the sampler 224. The sampler 224 is configured to forward an intermediate representation of the training error (e.g., value of the final loss function, or training error values at an intermediate layer in the neural network) for a given data-label pair if the training error exceeds a threshold. In FIG. 2B, the forwarded training error is represented by arrow 235. The central machine learning model 218 then performs a backward propagation process to update its model parameters using the forwarded training error 235. Therefore, in this example, the central machine learning model 218 does not receive any raw data-label pairs, but rather a forwarded training error generated based on data-label pairs.

In certain examples, each local site can use a different representation that is best matched to the data obtained the local site. For example, infrequent intermediate results may be transmitted unless, for example, a highly "surprising" data sample appears. Also, the central machine learning model can make requests for what are the desired representations for each edge node to send. As a simple example, this may be motivated by, for example, where the central machine learning model has little training data versus where the central machine learning model has a sufficient amount of training data.

The above examples which use video and a badge reader to identify a person have been used to facilitate understanding of the data sampling techniques presented herein. In general, the techniques presented may make use of any form of a two-factor or N-factor system where a first factor has a high probability of being accurate and the second factor has a lower probability of being accurate. In general, the data sampling techniques presented herein use inconsistencies between the first and second factors to determine when to sample the associated data for transmission to the central site and use in improvement of the central machine learning model. In the above example the first factor is badge and badge reader, and the second is video and machine learning-based face/person recognition.

Furthermore, as described above, the data sampling techniques operate to primarily send "high quality" data that can improve the second factor, e.g., high-quality captured images of the face that can be used for learning to improve the machine learning face recognition accuracy. For example, even though there may be a large number of frames of video captured and processed by the second factor, the techniques presented herein only select to transmit those frames that can help improve the second factor's performance. As noted above, the selection can incorporate face detection to ensure that the selected frame includes an appropriate capture of the face, or motion blur detection to preferentially not select frames with sizable more blur.

To illustrate the widespread applicability of the data sampling techniques presented herein, the following illustrates the use of the techniques in a food production arrangement. In food production, it is critically important that the food is adequately cooked and, in one arrangement, cooked food on a conveyor belt can be examined via both a red, green and blue (RGB) video camera and an infrared video camera. The RGB camera can sense various attributes of the food including shape, color and surface texture, while the infrared video camera can sense radiated heat and thereby estimate the temperature and temperature distribution across a piece of food. The use of an RGB video camera and an infrared video camera is a form of two-factor authentication where the resulting videos can be processed via an associated local machine learning model. If either of the factors (RGB or infrared) indicate that the food is significantly undercooked (i.e., inconsistent readings), then the food sample can be tested and the results (either sufficiently cooked or undercooked) can be selected and sent to a central site to improve a central machine learning model. This illustration is an example of a two-factor system where neither factor is authoritative, but an additional test can be performed when needed to provide an authoritative result. In accordance with the data sampling techniques presented herein, inconsistency across the two-factors leads to the data being sampled, and the data and authoritative result sent and incorporated in the learning to improve the model performance.

Figure 4:
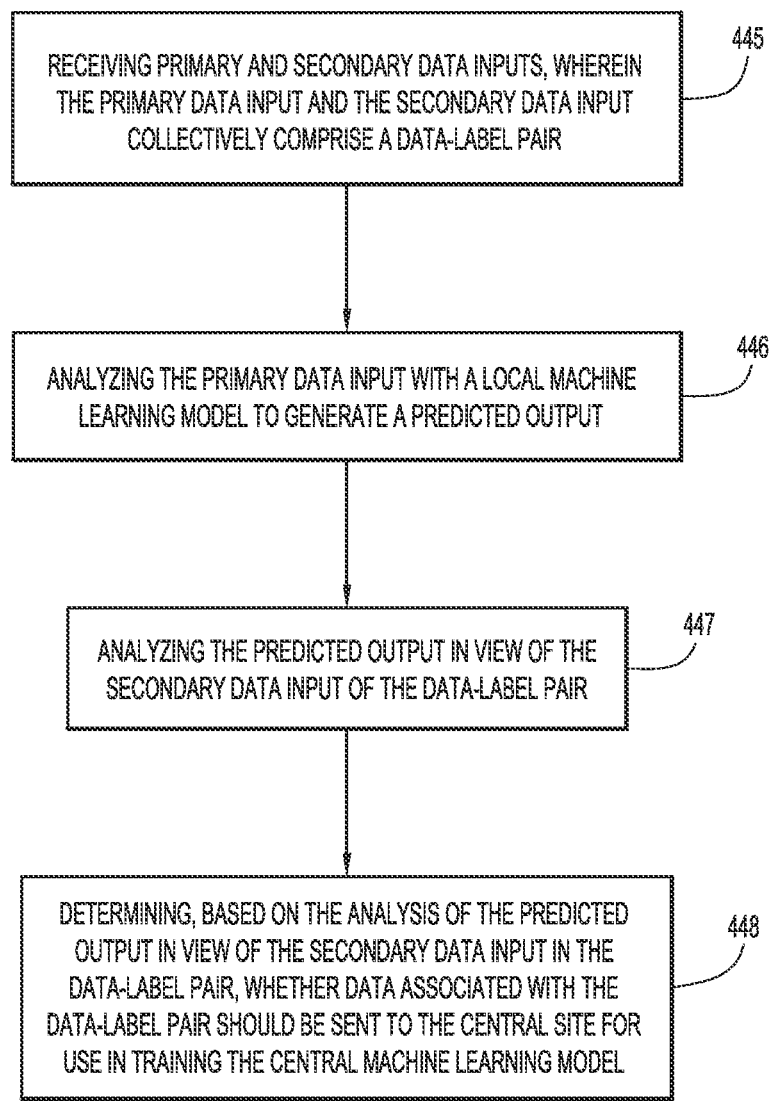
FIG. 4 is a flowchart of a data sampling method, in accordance with embodiments presented herein.

FIG. 4 is a flowchart of a data sampling method 450 in accordance with the techniques presented herein. Method 450 is primarily performed at a first computing device at a first of a plurality of local sites in communication with a central site comprising a second computing device that executes a central machine learning model. Method 444 begins at 445 where the first computing device receives primary and secondary data inputs. The primary data input and the secondary data input collectively comprise a data-label pair. At 446, the first computing device analyzes the primary data input with a local machine learning model to generate a predicted output. At 447, the first computing device analyzes the predicted output in view of the secondary data input of the data-label pair. At 448, based on the analysis of the predicted output in view of the secondary data input in the data-label pair, the first computing device determines whether data associated with the data-label pair should be sent to the central site for use in training the central machine learning model.

Figure 5:
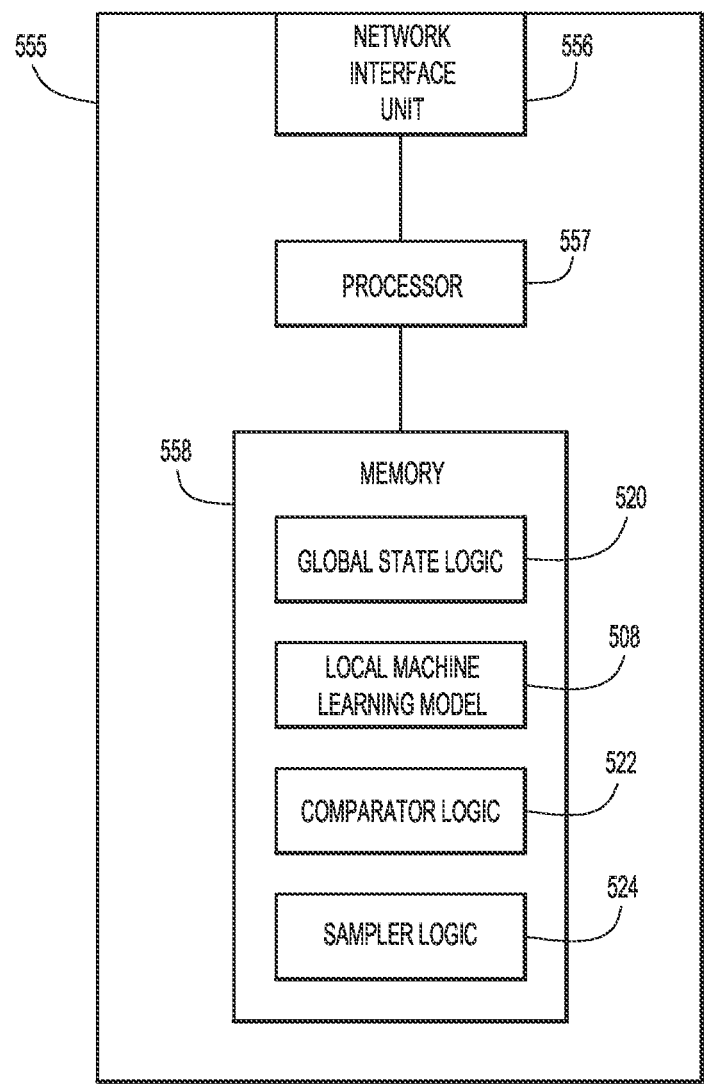
FIG. 5 is a block diagram of a computing device configured to implement data sampling techniques, in accordance with embodiments presented herein.

FIG. 5 is a block diagram of a computing device 555 configured to implement the data sampling techniques presented herein. That is, FIG. 5 illustrates one arrangement for a local machine learning unit (e.g., 106, 206) in accordance with examples presented herein. The computing device 555 includes a network interface unit 556 to enable network communications, one or more processors 557, and memory 558. The memory 558 stores software modules that include a global state logic 520, a local machine learning model 508, comparator logic 522, and sampler logic 524. These software modules, when executed by the one or more processors 577, causes the one or more processors to perform the operations described herein with reference to a local machine learning unit.

That is, the memory 578 may include Read Only Memory (ROM), Random Access Memory (RAM), magnetic disk storage media devices, optical storage media devices, flash memory devices, electrical, optical, or other physical/tangible memory storage devices. Thus, in general, the memory 578 may comprise one or more tangible (non-transitory) computer readable storage media (e.g., a memory device) encoded with software comprising computer executable instructions and when the software is executed (by the controller) it is operable to perform the operations described herein.

As noted, the data sampling techniques presented herein enable the local (edge) sites to independently and locally identify and filter the most relevant data samples that can improve a central machine learning model (i.e., selective transmission of data that is most relevant to improve the central machine learning model). This allows optimized use of network bandwidth since only the most relevant samples are selected and sent to the central site (e.g., avoids transmission of data that is not needed since the deployed model already accurately classifies this data). By directly transmitting data samples that are used in training, no changes are necessary to existing machine/deep learning software. As such, the techniques presented herein can improve the performance of the machine learning models while minimizing bandwidth usage and are widely applicable for settings where machine learning is employed in multiple locations in a distributed fashion, e.g., in different campuses, when large amount of data or video is involved.

Model Merging

As noted above, presented herein are techniques for training a central/global machine learning model using data from multiple locations, without actually transmitting all of the data or associated gradients to the central site for use in training the central machine learning model. The above described data sampling techniques intelligently select certain data for transmission to the central site. In the model merging techniques described further below, copies of the local machine learning models, potentially with lossless or lossy compression, are periodically sent to a central site for aggregation of learning by merging of the models.

More specifically, the model merging techniques presented herein solve the distributed learning problem without transmitting any training data or gradients from the local (edge) sites to the global/central site. Instead only copies of the local machine learning models (i.e., estimated model parameters, such as weights, biases, etc.) are sent from the local sites to the central site. In general, the size of the model parameters may be several orders of magnitude smaller than video or other types of data transmitted in conventional arrangements. When incremental versions of the model are transmitted between the local and central sites, it is also possible to represent only the consecutive differences in the model parameters, instead of their original values, in a more bandwidth-efficient manner.

Figure 6:
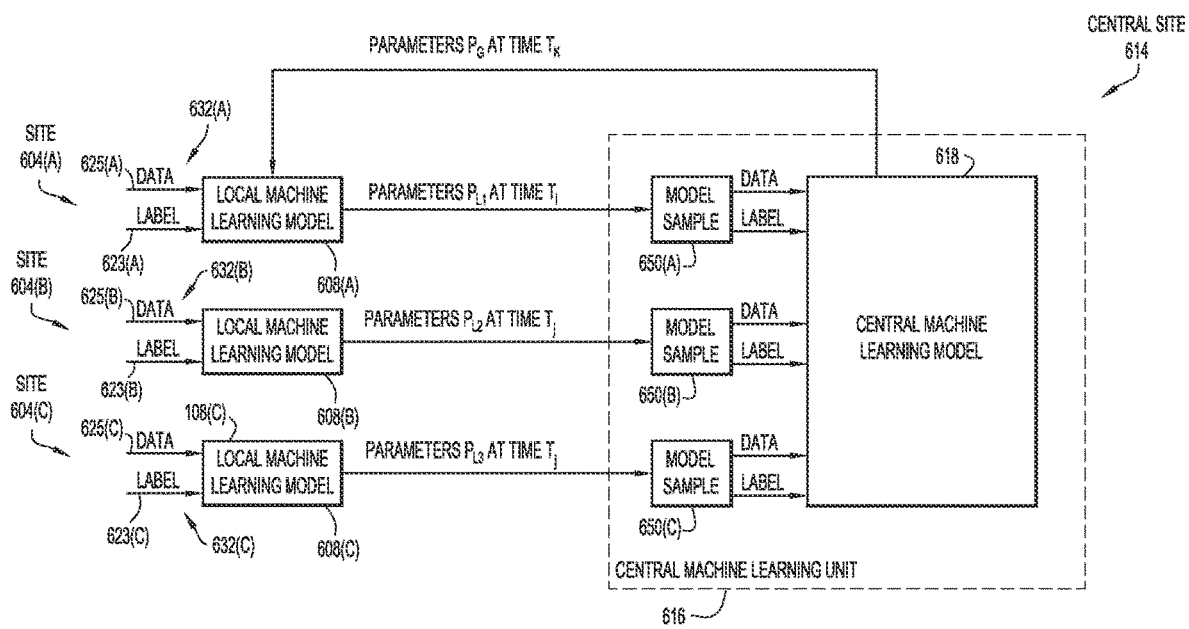
FIG. 6 is a schematic block diagram illustrating an arrangement configured to implement model merging techniques, in accordance with embodiments presented herein.

FIG. 6 is a high-level diagram illustrating a portion of the arrangement of FIG. 1 configured to implement the model merging techniques presented herein. In particular, shown in FIG. 6 is a central site 614 that includes a central machine learning unit 616. The central machine learning unit 616 includes a central machine learning model 618.

FIG. 6 also illustrates three distributed local sites 604(A), 604(B), and 604(C) that may be, for example, physically separate locations, such as campuses, branches, etc. Similar to the above arrangements, local sites 604(A), 604(B), and 604(C) each include a respective local machine learning model 608(A), 608(B), and 608(C). The local machine learning models 608(A), 608(B), and 608(C) are deployed and configured to perform the same task and, at least at initial deployment, are copies of the central machine learning model 618. As noted above, machine learning models can be trained to perform a number of different tasks. However, for ease of illustration, the techniques presented herein are described with reference to the local machine learning models 608(A), 608(B), and 608(C) performing a specific task, namely person recognition as a person enters a secured building at the corresponding site 604(A), 604(B), and 604(C).

As such, in the specific example of FIG. 6, each site also includes a respective image capture device 610(A), 610(B), and 610(C) (not shown in FIG. 6) that is configured to capture one or more still or moving images (e.g., videos) of persons entering through an entrance of a secured building at the corresponding site 604(A), 604(B), and 604(C). These captured images, which are represented in FIG. 6 by arrows 625(A), 625(B), or 625(C), are referred to herein as "primary data inputs" or, more simply "data," that is provided to the respective local machine learning models 608(A), 608(B), and 608(C). Local machine learning model 608(A), 608(B), or 608(C) use the captured images to make a "prediction" of the identity of the person entering the respective building.

Also as noted above, the sites 604(A), 604(B), and 604(C) each include a respective badge reader 612(A), 612(B), and 612(C) (also not shown in FIG. 4) that is located at the entrance of the secured building. In this example, to enter the respective secured buildings, a person has a personal identity (ID) badge and uses this badge to perform a badge swipe at the corresponding badge reader 612(A), 612(B), or 612(C). That is, as a person enters the secured building at local site 604(A), 604(B), or 604(C), he/she uses the respective badge reader 612(A), 612(B), or 612(C) to perform a badge swipe. The respective badge reader 612(A), 612(B), or 612(C) generates a badge output, represented by arrows 623(A), 623(B), or 623(C), that indicates the determined identity of the person (i.e., the identity determined based on the badge swipe). As shown in FIG. 6, these badge outputs 623(A), 623(B), and 623(C) are referred to herein as "secondary inputs" or as "labels" and are provided to the respective local machine learning models 608(A), 608(B), and 608(C). The person may be admitted to the building based on results of the badge swipe and/or the identity prediction by the local machine learning model.

One or more captured images (i.e., data 625(A), 625(B), or 625(C)) and an associated badge output (i.e., a label 623(A), 623(B), or 623(C) generated at substantially the same time) form a data-label pair 632(A), 632(B), or 632(C) that is used to train the corresponding local machine learning model 608(A), 608(B), or 608(C). In accordance with the model merging techniques presented herein, each local machine learning model 608(A), 608(B), and 608(C) periodically (e.g., asynchronously at any time scale, such as daily, weekly, etc.) sends its model parameters ($P_{Li}$) at appropriate time instances to the central site 614. As described further below, the model parameters ($P_{L1}$ for site 604(A), $P_{L2}$ for site 604(B), and $P_{L3}$ for site 604(C)) are used at the central location to synthesize appropriate data and labels at the central site 614, which in turn are used to train the central machine learning model 618. In one form, the model parameters $P_{L1}$, $P_{L2}$, and $P_{L3}$ are used to create respective copies of the local machine learning models, sometimes referred to herein as model samples 650(A), 650(B), and 650(C), which generate data-label pairs 652(A), 652(B), and 652(C), respectively, which are used to train the central machine learning model 618.

Once the central machine learning model 618 has been trained using the data-label pairs 652(A), 652(B), and 652(C), the parameters ($P_G$) of the central machine learning module 618 are sent to the local sites to refine and improve the local machine learning models 608(A), 608(B), and 608(C) using global information. The above process continues iteratively. The creation of the different versions/updates of the local and central models, as represented by their parameters, may be tracked by the time that they are communicated.

It is to be appreciated that each local site may receive different quantities of data for training and/or may have different numbers of "surprises" (i.e., situations in which the predicated label does not match the actual label). In accordance with examples presented herein, local sites may also be configured, in a number of different manners, to determine when their associated local models should be sent to the central site for aggregation/merging. In one example, the local sites may make this determination based on amount of data processed at each local site (e.g., once a local site receives 1000 data samples, the local site it sends a copy of its local model to the central site). In one arrangement, this update is sent once per day for a site that receives approximately 1000 data samples per day and once per minute for a site that receives 1000 per minute. These updates could be time varying (i.e., not necessarily periodic). Similarly, when a local site receives a sufficient number of surprises (e.g., data that is not accurately predicted by the associated local model), the local site it can decide to send a copy of the local model to the central site. For example, if a local site receives a number of surprises that satisfies a predetermined threshold (e.g., five (5) surprises), the local site it sends a copy of its associated local model to the local site. This type of update can occur at any time scale (e.g., once per minute, once per hour, once per month, etc.). Each local site may operate in this manner in which case updates are sent highly asynchronously from the various local sites. It is to be appreciated that, after the system runs for a sizable length of time and the models converge in terms of predicting accurately, the rate of model updates can significantly decrease. This is both in terms of updates from the local models to the central model, and vice versa.

In summary, each local site may operate in an adaptive manner to send a copy of its associated local model to the central site. This adaptive operation of the local sites may enable the overall system to quickly respond to and learn from changes in the data that is received at the local sites, as well as to reduce the unnecessary transmission of model updates (between local and central, and back) and training at the central site.

Figure 7:
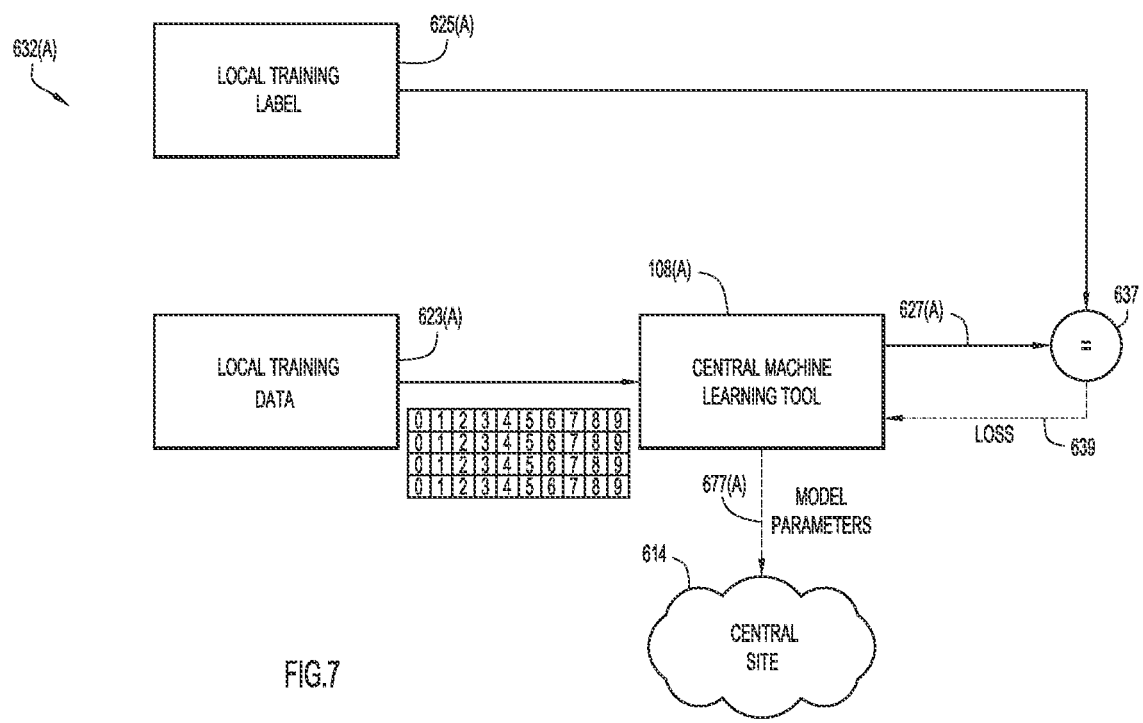
FIG. 7 is a schematic block diagram illustrating an arrangement of a local site configured to implement model merging techniques, in accordance with embodiments presented herein.

FIG. 7 is a block diagram illustrating further details of the operations performed at a local site 604(A) in accordance with the model merging techniques presented herein. As noted above, distributed arrangements include multiple sites and, as such, FIG. 7 illustrates one of a plurality of local arrangements that would be present in a distributed system. That is, the same or similar arrangement as shown in FIG. 7 would be implemented at multiple local sites (e.g., sites 604(B) and 604(C)).

At local site 604(A), data-label pairs 632(A), comprised of data 625(A) (i.e., one or more captured images) and an associated label 623(A) (i.e., a badge output generated at substantially the same time), are used to train the local machine learning model 608(A). This training process is generally depicted in FIG. 7 where a loss function 637 generates a loss 639 which represents the error/difference between a predicted label 627(A) (generated by the local machine learning model 608(A) based on the data) and the associated actual label 623(A) (the label in the data-label pair 632(A)). The determined loss is fed back to the local machine learning model 608(A) and used to adapt the model (e.g., the model weights) until the predicted label matches the label (i.e., the network trains itself by minimizing the loss/error).

As noted above, the parameters of the local machine learning model 608(A) are periodically sent to the central site 614. In FIG. 7, the parameters local machine learning model 608(A) are represented by arrow 677(A). In one example, a Stochastic Gradient Descent (SGD) optimization occurs locally, with no data or gradients transmitted to the central site 614. In other words, the model merging techniques only transmit the model parameters (and not the actual data or gradient values) from each local node to the central site for performing the global learning, therefore saving several orders of magnitude in reduced data delivery requirements. Furthermore, this enhances privacy since the raw data does not leave the local sites, and the model parameters that are sent provide very limited information about the ensemble of data at the local sites.

In general, the model merging operations performed at the central site 614 can be separated into two stages/phases. Details of the first stage are described with reference to FIG. 8, while details of the second stage are described with reference to FIG. 9. As such, FIGS. 8 and 9 illustrate different portions of central machine learning unit 616 of FIG. 6.

Figure 8:
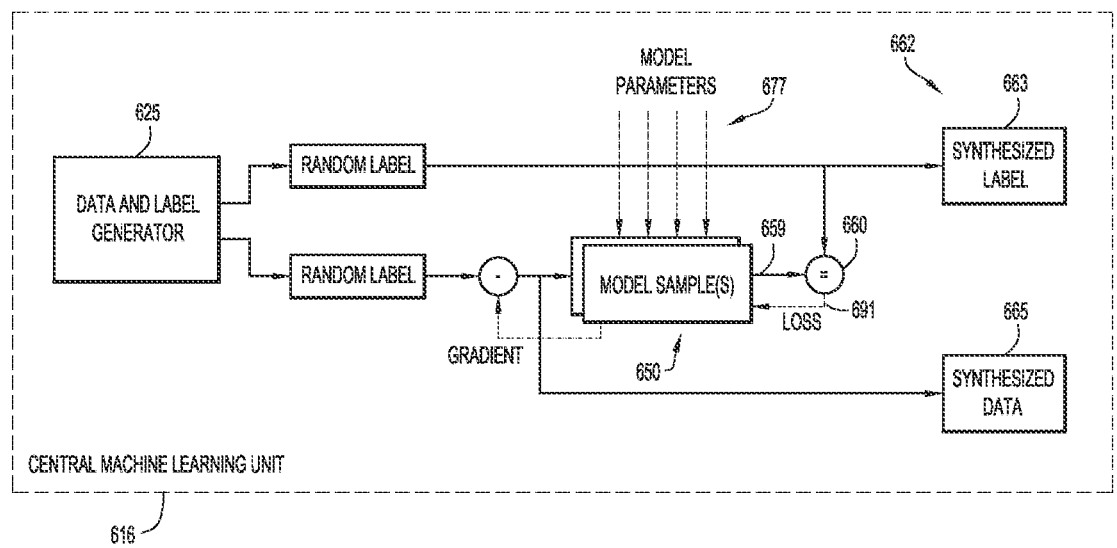
FIG. 8 is a schematic block diagram illustrating a first portion of a central site configured to implement model merging techniques, in accordance with embodiments presented herein.
Figure 9:
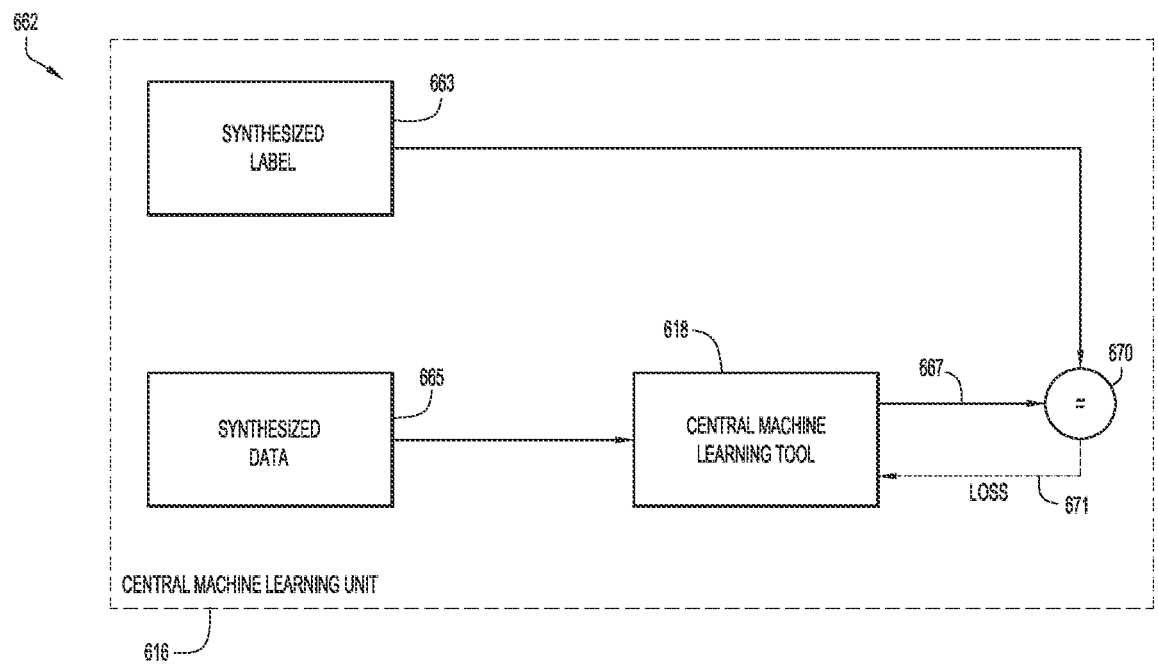
FIG. 9 is a schematic block diagram illustrating a first portion of a central site configured to implement model merging techniques, in accordance with embodiments presented herein.

Referring first to FIG. 8, shown is a block diagram illustrating operations of the central site 614 where model parameters received from the local sites 604(A), 604(B), and 604(C) (i.e., the model parameters associated with the local machine learning models 608(A), 608(B), and 608(C)) are used to generate synthetic data-label samples from each of the received local models. In FIGS. 8 and 9, the model parameters for the local machine learning models 608(A), 608(B), and 608(C) are generally represented by arrows 677.

Once the model parameters are received from the different local sites, copies of the local machine models are instantiated at the central site 614. These copies of the local models, sometimes referred to herein as model samples, are generally represented in FIG. 8 by reference number 650. In one example, an initial random data sample and a random label are generated by a data and label generator 625. The random data is sent through the forward path of a local model 650 to produce a predicted label 659. The predicted label is compared to the randomly generated label using a loss function 660, and the generated loss 691 is back-propagated through the local model 650 to generate a data gradient with respect to the loss and the data gradient is then subtracted from the random data sample (i.e., uses a backward gradient descent technique). Stated differently, during training, loss (error) is used to back propagate a gradient that is used to adjust the weights in the different layers to, eventually, minimize the error (reduce the loss). This process is repeated for several iterations until the loss generated by the loss function 660 approaches zero. In this example, the weights of the local model 650 are not adjusted in order to reduce the loss. Instead, the input data is iteratively modified using the gradient until the local model 650 believes that the input data represents the randomly chosen label. An arbitrary number of synthesized data-label pairs 662, each comprised of a synthesized label 663 and synthesized data 665, can be efficiently generated using this method. A unique feature of the above is that gradient descent techniques to generate synthetic data samples from a trained model.

In summary, the local model 650 operates as a discriminative, rather than as a generative, model. The local model 650 uses a backward gradient descent technique to produce data given a label (i.e., instead of using data to compute a conditional probability of the label given the data).

As noted, FIG. 8 illustrates the use of random data and random labels for use by the model samples 650. It is to be appreciated that other embodiments may use real data and labels for generation of the synthesized data and labels.

FIG. 9 shown is a block diagram illustrating operations of the central machine learning unit 615 where the synthesized data-label pairs 662 are used to train the central machine learning model 618. That is, the central machine learning model 618 uses the synthesized data 665 to generate a predicted label 667. A loss function 670 generates a loss 671 which represents the error/difference between the predicted label 667 and the synthesized label 663. The determined loss is fed back to the central machine learning model 618 and used to adapt the central machine learning model 618 until the predicted label 667 matches the synthesized label 663 (i.e., the network trains itself by minimizing the loss/error).

The central machine learning model 618 can be trained from scratch or fine-tuned using its existing weights. The synthesized data-label pairs 662 can be generated "on-the-fly," used to train the global model, and then discarded (i.e., the synthesized data-label pairs do not need to be stored). The training algorithm for the central machine learning model 618 can be any supervised type (e.g., SGD). In certain examples, the central machine learning model 618 may not have the same structure as the local models. For example, the central machine learning model 618 may be larger in order to capture the aggregate learning from many local models, or may have a completely different deep learning structure from the local models.

As noted above, the updated parameters of the central machine learning model 618 can be sent to the local sites to refine and improve the local models using the globally obtained information. For example, each local site may replace its local model with the central model, or perform a merge of the local model and the central model. A merge may be performed in a number of manners, including applying the above techniques in a reverse order where the central model parameters are used to synthesize data to further train the local models.

As described above, the model merging techniques presented herein may track the creation of the different local and central models, as represented by their parameters, and by the time that they are communicated. Specifically, each local site may produce a sequence of local models at different times, and the central machine learning model may produce a sequence of central models at different times. In many use cases the sequence of models will exhibit improved performance over time as more data has been incorporated in their training, and furthermore the training is effectively shared between both local and central nodes.

In the above examples of FIGS. 6-9, only machine learning model parameters are sent from the local to remote sites. In general, these techniques can augmented with meta-data/context information. That is, in addition to transmitting the model parameters, it may be beneficial to transmit information related to the data used to create the local model.

Figure 10:
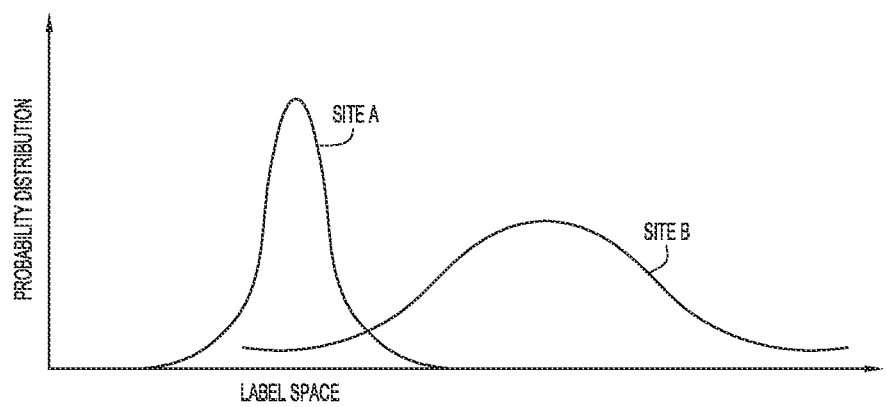
FIG. 10 is a graph illustrating probability distribution of labels for two local sites, in accordance with embodiments presented herein.

FIG. 10 is a graph illustrating one such example in which a local model A (at local site A) is generated from 100 data points and a local model B is generated using 100,000 data points. In particular, FIG. 10 illustrates the label distributions at each of these sites. In such an example, it may be beneficial to convey this information to the central site so the local models instantiated at the central site can be adapted appropriately to create the central model. For example, one approach for generating the central model is to generate 100 sample synthesized data points from the instantiated model from site A and 100,000 synthesized sample data points from the instantiated model from site B. It is to be appreciated that many other approaches may be employed to account for the different amounts of data or to otherwise provide different weightings to the local models when creating the central model.

As a second example, consider the case when the different local models were generated using data covering different input ranges. To make this more concrete, consider the case of estimating the travel distance of an electronic vehicle (EV) on a full charge. Local model A may have been produced based on data obtained from a car operating in California (~70 degree temperatures) and local model B may have been produced by a car operating in in Alaska (~30 degree temperatures). Since the range of an electronic vehicle has a strong dependence on the temperature, local model A best estimates the results for warm temperatures and may be less accurate at extrapolating the results for cold temperatures. Conversely, local model B best estimates the results for cold temperatures and may be less accurate at extrapolating the results for warm temperatures. By conveying to the central machine learning model the different input ranges which were used to generate each local model, then these same input ranges can be used at the global node during creation of the synthetic data to produce a more accurate global model. This is a simple example to account for a simple, scalar parameter, but there are many cases where the context for the creation of a local model is important to convey to the global node and would lead to the creation of a more accurate global model.

Figure 11:
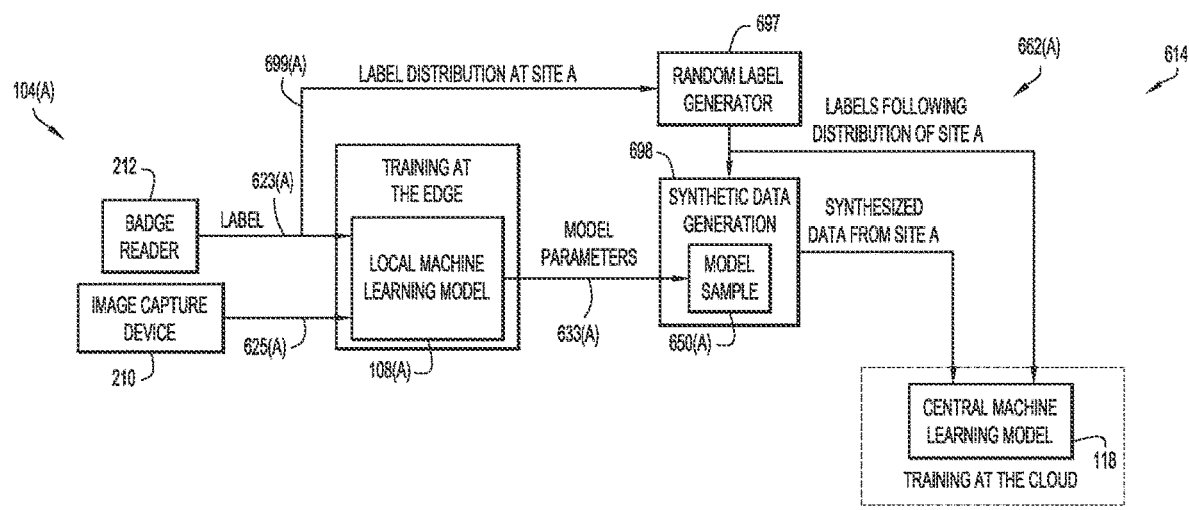
FIG. 11 is a schematic block diagram illustrating another arrangement configured to implement model merging techniques, in accordance with embodiments presented herein.

FIG. 11 is a simplified block diagram illustrating an arrangement in which model parameters and meta-data are both sent from a local site 604(A) to a central site 614. In this example, as described above, the model parameters 650(A) for local machine learning model 608(A) are sent to the central site 614. The meta-data sent from the local site 604(A) to a central site 614 is the label distribution 699(A) for the labels associated with the model parameters 655(A). The central site 614 includes a random label generator 697 and a synthetic data generation module 698 (with model sample 650(A) instantiated at the central site) that use the label distribution 699(A) when generating the synthesized data-label pairs 662(A).

Figure 12:
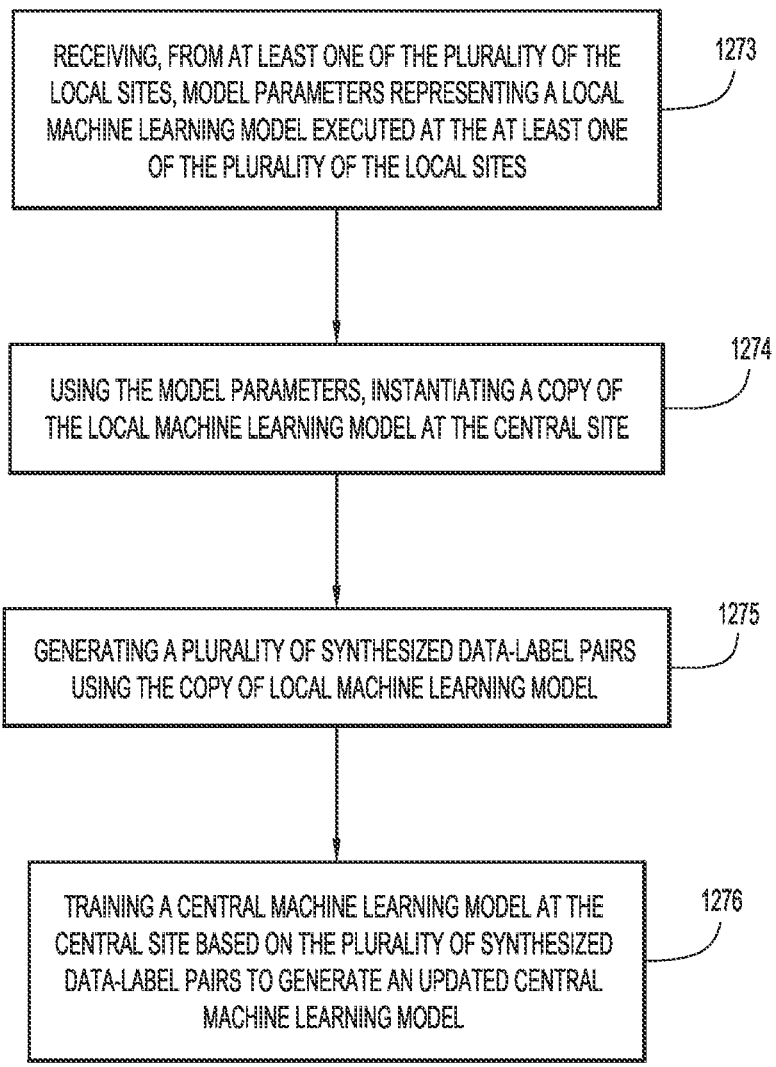
FIG. 12 is a flowchart of a model merging method, in accordance with embodiments presented herein.

FIG. 12 is a flowchart of a model merging sampling method 1272 in accordance with the techniques presented herein. Method 1272 is primarily performed at a first computing device at a central site in communication with a plurality of local sites. Method 1272 begins at 1273 where the first computing device model receives parameters representing a local machine learning model executed at least one of the plurality of the local sites. At 1274, the first computing device uses the model parameters to instantiate a copy of the local machine learning model at the central site. At 1275, the first computing device uses the copy of local machine learning model to generate a plurality of synthesized data-label pairs. At 1276, a central machine learning model at the central site is trained based on the plurality of synthesized data-label pairs to generate an updated central machine learning model.

Figure 13:
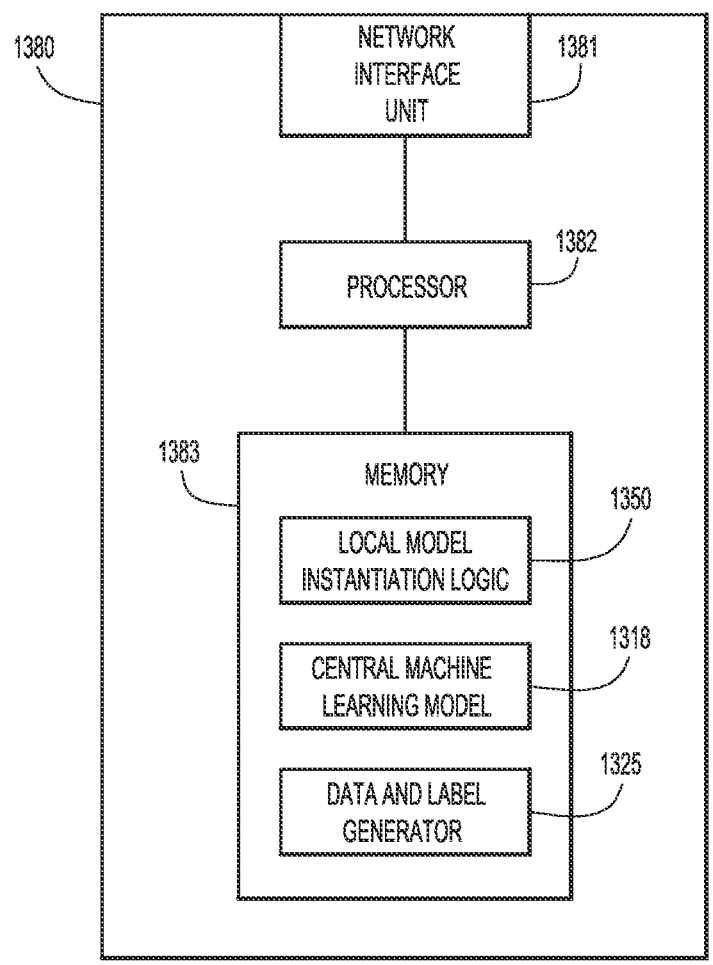
FIG. 13 is a block diagram of a computing device configured to implement model merging techniques, in accordance with embodiments presented herein.

FIG. 13 is a block diagram of a computing device 1380 configured to implement the model merging techniques presented herein. That is, FIG. 13 illustrates one arrangement for a central learning unit (e.g., 116, 616) in accordance with examples presented herein. The computing device 1380 includes a network interface unit 1381 to enable network communications, one or more processors 1382, and memory 1383. The memory 1383 stores software modules that include local model instantiation logic 1350, a central machine learning model 1318, and a data and label generator 1325. These software modules, when executed by the one or more processors 577, causes the one or more processors to perform the operations described herein with reference to a central machine learning unit.

That is, the memory 1383 may include ROM, RAM, magnetic disk storage media devices, optical storage media devices, flash memory devices, electrical, optical, or other physical/tangible memory storage devices. Thus, in general, the memory 1383 may comprise one or more tangible (non-transitory) computer readable storage media (e.g., a memory device) encoded with software comprising computer executable instructions and when the software is executed (by the controller) it is operable to perform the operations described herein.

In the model merging techniques presented herein, the central/global machine learning model uses synthetic data-label pairs that are created using copies of the local models. As such, the central machine learning model is able to learn the aggregate knowledge of multiple local models without the need to transmit the actual data to the central site. As a result, the bandwidth and latency requirements between the local and central sites are significantly reduced. In addition, this approach is privacy preserving as the data is never communicated beyond the local site (i.e., the data is not sent to the central site to produce the central model).

In summary, presented above are several techniques for training a central/global machine learning model. In the data sampling techniques, data is intelligently selected for central training, while in the model merging techniques, distributed local training occurs in each local site and local models are periodically sent to a central location for aggregation of learning by merging of the models. As a result, in accordance with the examples presented herein, a global model can be trained based on various representations/transformations of data seen at the local nodes, including sampled selections of data-label pairs, intermediate representation of training errors, or synthetic data-label pairs generated by models trained at various local sites.

In one aspect, a computer implemented method is provided. The method comprises: at a first computing device at a first of a plurality of local sites in communication with a central site comprising a second computing device that executes a central machine learning model: receiving primary and secondary data inputs, wherein the primary data input and the secondary data input collectively comprise a data-label pair; analyzing the primary data input with a local machine learning model to generate a predicted output; analyzing the predicted output in view of the secondary data input of the data-label pair; and determining, based on the analysis of the predicted output in view of the secondary data input in the data-label pair, whether data associated with the data-label pair should be sent to the central site for use in training the central machine learning model.

In another aspect, an apparatus at a first of a plurality of local sites each in communication with a central site comprising a second computing device that executes a central machine learning model is provided. The apparatus comprises: a network interface unit; a memory; and one or more processors configured to: receive primary and secondary data inputs, wherein the primary data input and the secondary data input collectively comprise a data-label pair; analyze the primary data input with a local machine learning model to generate a predicted output; analyze the predicted output in view of the secondary data input of the data-label pair; and determine, based on the analysis of the predicted output in view of the secondary data input in the data-label pair, whether data associated with the data-label pair should be sent to the central site for use in training the central machine learning model.

In another aspect, one or more non-transitory computer readable storage media at a first computing device at a first of a plurality of local sites in communication with a central site comprising a second computing device that executes a central machine learning model are provided. The one or more non-transitory computer readable storage media are encoded with instructions that, when executed by a processor, cause the processor to: receive primary and secondary data inputs, wherein the primary data input and the secondary data input collectively comprise a data-label pair; analyze the primary data input with a local machine learning model to generate a predicted output; analyze the predicted output in view of the secondary data input of the data-label pair; and determine, based on the analysis of the predicted output in view of the secondary data input in the data-label pair, whether data associated with the data-label pair should be sent to the central site for use in training the central machine learning model.

In another aspect, a computer implemented method is provided. The method comprises: at a first computing device at a central site in communication with a plurality of local sites: receiving, from at least one of the plurality of the local sites, model parameters representing a local machine learning model executed at the at least one of the plurality of the local sites; using the model parameters, instantiating a copy of the local machine learning model at the central site; generating a plurality of synthesized data-label pairs using the copy of local machine learning model; and training a central machine learning model at the central site based on the plurality of synthesized data-label pairs to generate an updated central machine learning model.

In another aspect, an apparatus at a central site in communication with a plurality of local sites is provided. The apparatus comprises: a network interface unit; a memory; and one or more processors configured to: receive, from at least one of the plurality of the local sites, model parameters representing a local machine learning model executed at the at least one of the plurality of the local sites; use the model parameters, instantiating a copy of the local machine learning model at the central site; generate a plurality of synthesized data-label pairs using the copy of local machine learning model; and train a central machine learning model at the central site based on the plurality of synthesized data-label pairs to generate an updated central machine learning model.

In another aspect, one or more non-transitory computer readable storage media at a first computing device at a central site in communication with a plurality of local sites is provided. The one or more non-transitory computer readable storage media are encoded with instructions that, when executed by a processor, cause the processor to: receive, from at least one of the plurality of the local sites, model parameters representing a local machine learning model executed at the at least one of the plurality of the local sites; use the model parameters, instantiating a copy of the local machine learning model at the central site; generate a plurality of synthesized data-label pairs using the copy of local machine learning model; and train a central machine learning model at the central site based on the plurality of synthesized data-label pairs to generate an updated central machine learning model.

It is to be appreciated that the above examples are not mutually exclusive and may be combined in various arrangements. It is also to be appreciated that the above description is intended by way of example only. Various modifications and structural changes may be made therein without departing from the scope of the concepts described herein and within the scope and range of equivalents of the claims.

What is claimed is:

1. A computer implemented method comprising:
    at a first computing device at a first local site of a plurality of local sites in communication with a central site comprising a second computing device that executes a central machine learning model:
        receiving a primary data input that is a first type of data relating to information and a secondary data input that is a second type of data relating to the information, wherein the primary data input and the secondary data input collectively comprise a data-label pair;
        analyzing the primary data input with a local machine learning model to generate a predicted output that predicts the information represented by the secondary data input;
        analyzing the predicted output in view of the secondary data input of the data-label pair to attempt to validate the information predicted by the predicted output to produce validated information, wherein the validated information and the secondary data input provide two-factor authentication of the information; and
        determining, based on the analyzing of the predicted output in view of the secondary data input in the data-label pair, whether data associated with the data-label pair should be sent to the central site for use in training the central machine learning model to guide two-factor authentication at the plurality of local sites.

2. The computer implemented method of claim 1, further comprising:
    determining that the data associated with the data-label pair should be sent to the central site;
    sending the data associated with the data-label pair from the first local site to the central site; and
    training the central machine learning model based on the data associated with the data-label pair sent from the first local site to the central site to generate an updated central machine learning model.

3. The computer implemented method of claim 2, wherein sending the data associated with the data-label pair from the first local site to the central site comprises:
    sending the data-label pair comprising the primary data input and the secondary data input to the central site.

4. The computer implemented method of claim 3, further comprising:
    sending meta-data associated with the data-label pair from the first local site to the central site, wherein the meta-data includes an indication of whether or not the predicted output matches the secondary data input.

5. The computer implemented method of claim 2, wherein sending the data associated with the data-label pair from the first local site to the central site comprises:
    sending a representation of a training error determined by the local machine learning model to the central site.

6. The computer implemented method of claim 2, further comprising:
    sending model parameters representing the updated central machine learning model from the central site to one or more of the plurality of local sites.

7. The computer implemented method of claim 1, wherein analyzing the predicted output in view of the secondary data input of the data-label pair comprises:
    comparing the predicted output to the secondary data input to determine a difference.

8. The computer implemented method of claim 7, further comprising:
determining whether the difference exceeds a predetermined threshold; and
when the difference exceeds the predetermined threshold, forwarding the data-label pair to the central site.

9. The computer implemented method of claim 8, further comprising:
when the difference does not exceed the predetermined threshold, forwarding the data-label pair to the central site based on results of a probability distribution calculation.

10. The computer implemented method of claim 1, wherein the first computing device operates adaptively to determine whether data associated with the data-label pair should be sent to the central site for use in training the central machine learning model.

11. A computer implemented method, comprising:
at a first computing device at a central site in communication with a plurality of local sites:
receiving, from at least one of the plurality of the local sites, model parameters representing a trained local machine learning model for two-factor authentication of information executed at the at least one of the plurality of the local sites;
using the model parameters, instantiating a copy of the trained local machine learning model at the central site;
generating a plurality of synthesized data-label pairs from data provided by at least a random label generator using the copy of the trained local machine learning model, wherein the plurality of synthesized data-label pairs include a primary data input that is a first type of data relating to information and a secondary data input that is a second type of data relating to the information; and
training a central machine learning model at the central site based on the plurality of synthesized data-label pairs to generate an updated central machine learning model to guide two-factor authentication at the plurality of local sites.

12. The computer implemented method of claim 11, wherein generating the plurality of synthesized data-label pairs using the copy of the trained local machine learning model comprises:
processing, at the central site, a data sample with the copy of the trained local machine learning model to generate a predicted label, wherein each of the synthesized data-label pairs comprises the data sample and the predicted label.

13. The computer implemented method of claim 12, wherein the copy of the trained local machine learning model is a generative model, and wherein the data sample comprises a sample of real data obtained at the central site.

14. The computer implemented method of claim 11, wherein generating the plurality of synthesized data-label pairs using the copy of the trained local machine learning model comprises:
iteratively analyzing a data-label pair with the copy of the trained local machine learning model, wherein at each iteration a primary data input of the data-label pair is adjusted based on a predictive output generated by the trained local machine learning model in response to analyzing the primary data input of the data-label pair.

15. The computer implemented method of claim 14, wherein iteratively analyzing the data-label pair comprises:
using a backward gradient descent technique to adjust the primary data input of the data-label pair based on a difference between the predictive output generated by the trained local machine learning model with the primary data input and a label provided by a secondary data input of the data-label pair.

16. The computer implemented method of claim 14, wherein the data-label pair is a randomly generated data-label pair and includes a secondary data input generated by the random label generator.

17. The computer implemented method of claim 11, further comprising:
sending model parameters representing the updated central machine learning model from the central site to one or more of the plurality of local sites.

18. The computer implemented method of claim 11, further comprising:
receiving meta-data associated with the trained local machine learning model executed at the at least one of the plurality of the local sites, wherein the meta-data is information related to the data used to create the trained local machine learning model; and
generating the plurality of synthesized data-label pairs further based on the meta-data.

19. The computer implemented method of claim 18, wherein the meta-data comprises a label distribution for labels associated with local machine learning model.

20. The computer implemented method of claim 11, wherein the central machine learning model has a different structure than the trained local machine learning model.

21. An apparatus at a first local site of a plurality of local sites each in communication with a central site comprising a computing device that executes a central machine learning model, the apparatus comprising
a network interface unit;
a memory; and
one or more processors coupled to the network interface unit and to the memory, and configured to:
receive a primary data input that is a first type of data relating to information and a secondary data input that is a second type of data relating to the information, wherein the primary data input and the secondary data input collectively comprise a data-label pair;
analyze the primary data input with a local machine learning model to generate a predicted output that predicts the information represented by the secondary data input;
analyze the predicted output in view of the secondary data input of the data-label pair to attempt to validate the information predicted by the predicted output to produce validated information, wherein the validated information and the secondary data input provide two-factor authentication of the information; and
determine, based on analyzing the predicted output in view of the secondary data input in the data-label pair, whether data associated with the data-label pair should be sent to the central site for use in training the central machine learning model to guide two-factor authentication at the plurality of local sites.

22. The apparatus of claim 21, wherein the one or more processors are configured to:
determine that the data associated with the data-label pair should be sent to the central site;
send the data associated with the data-label pair from the first local site to the central site; and
train the central machine learning model based on the data associated with the data-label pair sent from the first local site to the central site to generate an updated central machine learning model.

23. The apparatus of claim 22, wherein to send the data associated with the data-label pair from the first local site to the central site, the one or more processors are configured to:
send the data-label pair comprising the primary data input and the secondary data input to the central site.

24. The apparatus of claim 23, wherein the one or more processors are configured to:
send meta-data associated with the data-label pair from the first local site to the central site, wherein the meta-data includes an indication of whether or not the predicted output matches the secondary data input.

* * * * *